No. 629,032. Patented July 18, 1899.
W. R. GULICK.
SPEEDER FOR BICYCLES.
(Application filed May 31, 1898.)
(No Model.)

Witnesses

Inventor
William R. Gulick
by
Attorneys

UNITED STATES PATENT OFFICE.

WILLIAM READING GULICK, OF BAY HEAD, NEW JERSEY.

SPEEDER FOR BICYCLES.

SPECIFICATION forming part of Letters Patent No. 629,032, dated July 18, 1899.

Application filed May 31, 1898. Serial No. 682,195. (No model.)

*To all whom it may concern:*

Be it known that I, WILLIAM READING GULICK, a citizen of the United States, residing at Bay Head, in the county of Ocean and State of New Jersey, have invented certain new and useful Improvements in Speeders for Bicycles, of which the following is a specification.

My invention has for its object to obviate some of the strains and reduce the effects of some of the forces tending to throw the wheel of a bicycle out of balance; and to this end my invention consists in an attachment for a wheel of a bicycle, as fully set forth hereinafter and as illustrated in the accompanying drawings, in which—

Figure 1:
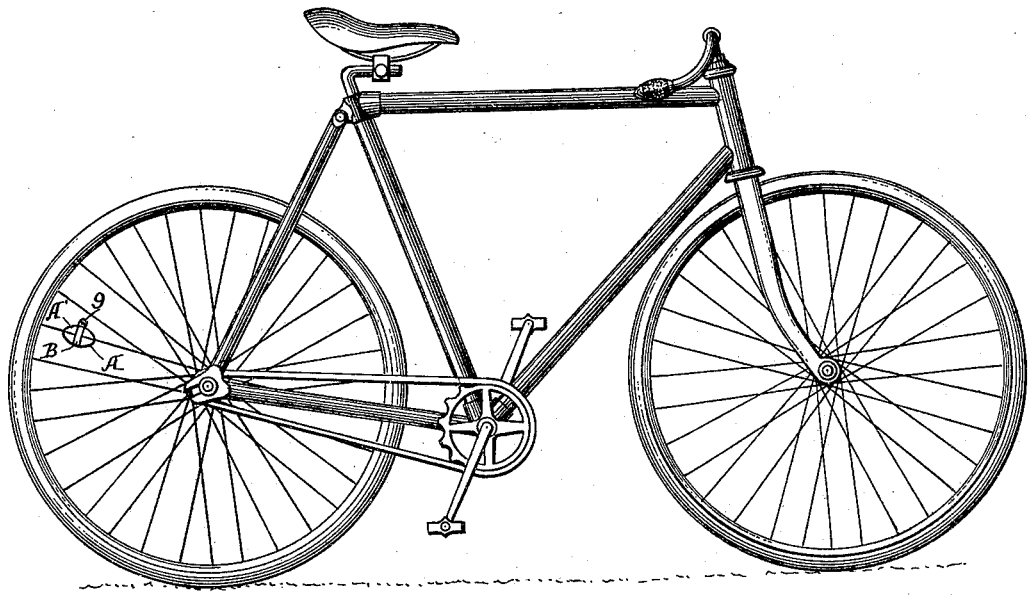
Figure 2:
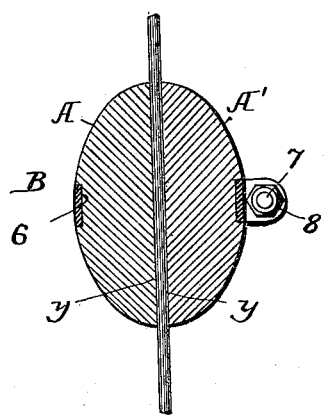
Figure 3:
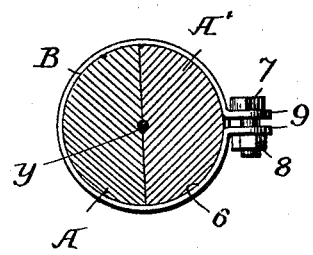

Figure 1 is an elevation of a bicycle with my improved attachment. Fig. 2 is a longitudinal section of the device. Fig. 3 is a transverse section.

My improved attachment consists of two blocks A A', of lead or other heavy material and of any suitable shape, preferably of such a form, however, that when they are put together face to face they will present an egg-shaped outline, and in the flat face of each block is a longitudinal groove $y$ of such a size that when the blocks are brought together the said grooves will receive one of the spokes of a bicycle. In connection with these blocks is used a clamp B of suitable construction, as shown consisting of a single strip of metal bent round to fit a recess 6 in the block and to form ears 9 9 at the ends, through which ears extends a bolt 7, provided with a nut 8.

In adjusting and securing the device to a bicycle the two blocks A A' are placed upon one of the spokes thereof at any suitable point, so that the said spoke will lie in the grooves $y$ $y$, and the clamp B is then slipped over the blocks until it enters the recess 6, when the nut is turned to tighten the bolt, bind the clamp in the recess 6, and bring the two blocks A A' firmly against the spoke, binding the device immovably thereto.

The above-described device may be attached to any spoke and in any desired position, the adjustment being such as will best secure the effects of the momentum of the heavy weight in overcoming the strain of the chain and other forces tending to disarrange the proper relation of the wheel to the frame of the vehicle in running.

While I have described a certain form of blocks and clamp, it will be evident that the forms and proportions of the blocks or mode of clamping may be changed without materially departing from the nature of my invention.

Without limiting myself to the precise construction and arrangement of parts described, I claim—

An attachment for vehicle-wheels comprising a weight formed of longitudinal sections having grooves in their contacting faces for reception of a wheel-spoke said weight being longitudinally adjustable upon the spoke and means for securing the weight-sections together and to the said spoke, substantially as described.

In testimony whereof I have signed my name to this specification in the presence of two subscribing witnesses.

WILLIAM READING GULICK.

Witnesses:
CLAUDE D. UPDIKE,
CHAS. M. GRIFFING.